Nov. 1, 1932.    R. M. GILSON    1,885,908
APPARATUS FOR CHARGING STORAGE BATTERIES
Filed July 3, 1930
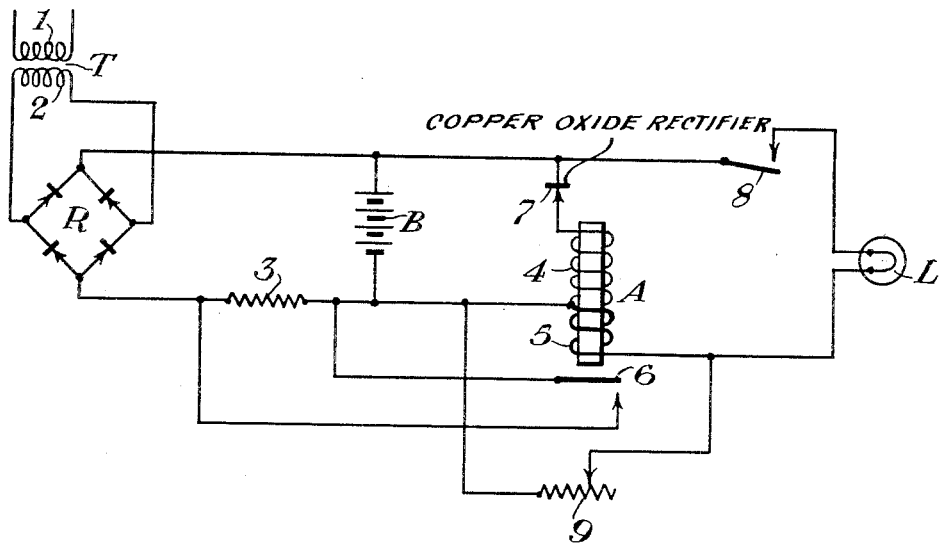
INVENTOR:
R. M. Gilson,
BY
His ATTORNEY Patented Nov. 1, 1932

1,885,908

UNITED STATES PATENT OFFICE

ROBERT M. GILSON, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

APPARATUS FOR CHARGING STORAGE BATTERIES

Application filed July 3, 1930. Serial No. 465,570.

My invention relates to apparatus for charging storage batteries, and has for an object the provision of means for automatically adjusting the charging rate to keep the battery fully charged under all conditions.

I will describe one form of apparatus embodying my invention, and will then point out the novel features thereof in claims.

The accompanying drawing is a diagrammatic view showing one form of apparatus embodying my invention.

Referring to the drawing, the reference character T designates a transformer, the primary 1 of which is constantly connected with a source of alternating current, which is not shown in the drawing, and the secondary 2 of which is connected with the input terminals of a full-wave rectifier. The output terminals of this rectifier are connected with a storage battery B through a current-limiting resistance 3. The value of this resistance is such that when it is included in the charging circuit the battery receives a very small amount of current and is therefore on what is known as "trickle charge".

The regulating apparatus comprises a relay A having two opposing windings 4 and 5. Winding 4 is connected across the terminals of battery B, and winding 5 is included in the output circuit for the battery, which circuit also includes a contact 8, and a load which is here represented by a lamp L. The winding 4 will usually be of relatively high resistance, and the winding 5 will usually be of relatively low resistance. Relay A is provided with a back contact 6, which, when closed, completes a low resistance shunt around the charging circuit resistance 3.

The relay A is so adjusted that when the output circuit becomes closed at contact 8, the output current from the battery B flowing through winding 5 will oppose the flux due to winding 4, and will cause relay A to open, thereby closing back contact 6. The relay is further so adjusted that when the contact 8 is again opened, thereby opening the circuit for winding 5, the flux due to winding 4 will not be sufficient to close the armature unless battery B is fully charged.

The operation of the apparatus thus far described, is as follows: When battery B is fully charged and contact 8 is open, relay A will be closed due to the voltage applied to winding 4 by the battery. Contact 6 is therefore open, so that resistance 3 is not shunted, and, consequently, the battery B is on trickle charge, that is, it is supplied with sufficient current to compensate for internal losses. When contact 8 is closed, the output current from the battery B through winding 5 will oppose the current in winding 4 and so will cause the armature of relay A to open. This will close contact 6, thereby reducing the resistance of the charging circuit, with the result that the current supplied to the battery B will be materially increased. When contact 8 again opens, relay A will remain open until the battery becomes fully charged, whereupon, the voltage across winding 4 will be sufficient to close the armature of relay A and thereby restore the battery to the trickle charge condition.

With the apparatus thus far described, it might be difficult to insure the pick-up of relay A for a given voltage of battery B under all temperature conditions. To avoid this difficulty, I prefer to include in series with the winding 4 a device 7 having a negative temperature-resistance characteristic, so that as the ambient temperature varies, the resistance of the device 7 will vary inversely, thereby compensating for the change in the resistance of winding 4. In this way the total resistance of winding 4 and device 7 can be held constant under temperature variations, so that the relay will always be picked up by a voltage corresponding to that of the fully charged battery regardless of ambient temperature. This device 7 may conveniently be a copper oxide rectifier connected in the circuit in such direction that the current supplied to winding 4 by battery B passes through the rectifier in its low resistance direction. The copper oxide rectifier has the characteristic set forth above, and I have found that it is suitable for this purpose.

In the event that it is undesirable to take all of the current for load L through relay winding 5, this winding may be provided with a shunt including an adjustable resistance 9.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, a storage battery, a charging circuit and an output circuit for said battery, a relay having two opposing windings one of which is connected across the terminals of said battery and the other of which is included in said output circuit, the relay being so adjusted that it is open when the output circuit is closed and that it will close when the output circuit is open if and only if the battery is fully charged, and means for increasing the charging rate of said battery responsive to the opening of said relay.

2. In combination, a storage battery, a charging circuit and an output circuit for said battery, a relay having two opposing windings one of which is connected across the terminals of said battery and the other of which is included in said output circuit, a rectifier having a negative temperature-resistance characteristic connected in series with said first relay winding in such direction that the current supplied to the winding by the battery flows through the rectifier in its low resistance direction, the relay being so adjusted that it is open when the output circuit is closed and that it will close when the output circuit is open if and only if the battery is fully charged, and means for increasing the charging rate of said battery responsive to the opening of said relay.

3. In combination, a storage battery, a charging circuit including said battery and a resistance, an output circuit for said battery, a relay having two opposing windings one of which is connected across the terminals of said battery and the other of which is included in said output circuit, the relay being so adjusted that it is open when the output circuit is closed and that it will close when the output circuit is open if and only if the battery is fully charged, and a low resistance shunt around said charging circuit resistance including a back contact of said relay.

4. In combination, a storage battery, a charging circuit and an output circuit for said battery, a relay having a winding connected across the terminals of said battery and so adjusted that when the relay is open it will not close unless the battery is fully charged, means for opening said relay when said output circuit is closed, a device having a negative temperature-resistance characteristic connected in series with said relay winding, and means for increasing the charging rate of said battery responsive to the opening of said relay.

5. In combination, a storage battery, a charging circuit and an output circuit for said battery, a relay having a winding connected across the terminals of said battery and so adjusted that when the relay is open it will not close unless the battery is fully charged, means for opening said relay when said output circuit is closed, a device having a negative temperature-resistance characteristic included in circuit with said relay winding for compensating for the effect of temperature variations on such winding to insure that the relay will close only when the battery is fully charged regardless of the ambient temperature, and means for increasing the charging rate of said battery responsive to the opening of said relay.

In testimony whereof I affix my signature.

ROBERT M. GILSON.